United States Patent Office

3,475,405
Patented Oct. 28, 1969

3,475,405
COBALT COMPLEX MONOAZO DYESTUFFS
Ugo Moiso, Cesano Maderno, Milan, and Sisto Sergio Papa, Milan, Italy, assignors to Aziende Colori Nazionali Affini ACNA S.p.A., Milan, Italy
No Drawing. Continuation-in-part of application Ser. No. 292,742, July 3, 1963. This application Jan. 4, 1967, Ser. No. 607,165
Int. Cl. C07c *107/08;* C09b *45/20*
U.S. Cl. 260—151                    2 Claims

ABSTRACT OF THE DISCLOSURE

Metallized dyestuffs, having a blue shade, particularly suitable for dyeing synthetic or natural polyamidic materials and a process for obtaining said metallized dyestuffs. The cobalt complexes of the monoazo compounds have the formula:

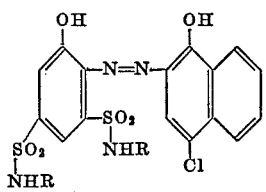

(II)

wherein R is an alkyl radical having 1 to 4 carbon atoms and wherein the $C_o$ to monoazo ratio is 1:2. The process of the invention comprises reacting the monoazo compound, under anhydrous conditions, with a substantially stoichiometric amount of a cobalt salt at a temperature of from about 100 to 140° C. in the presence of a mixture comprising from about 1 to 100 parts by weight of urea and from about 30 to 130 parts of dimethyl formamide or ethyleneglycol.

---

This application is a continuation-in-part of copending application Ser. No. 292,742, filed on July 3, 1963, now abandoned.

Our copending application Ser. No. 256,235, now U.S. Patent No. 3,244,691, relates to the metallized dyestuffs derived from azo compounds of the type:

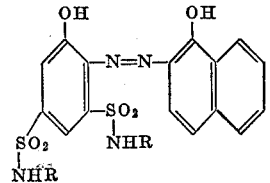

(I)

wherein R is an alkyl radical having a low molecular weight.

We have now found that when a derivative of the 1-naphthol having a chlorine atom in the 4 position is used as a coupling agent, monoazo compounds are obtained which, by metallization, give very effective dyestuffs. These dyestuffs are particularly valuable for dyeing natural and synthetic polyamidic materials in neutral pH conditions.

Accordingly, the present invention provides metallized dyestuffs derived from monoazo compounds of the general formula:

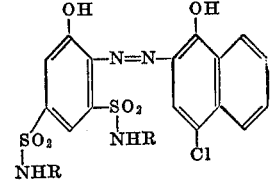

(II)

wherein R is an alkyl radical having 1 to 4 carbon atoms.

In particular, the cobalt complex (Co:monoazo ratio of 1:2) of the monoazo compound of the formula:

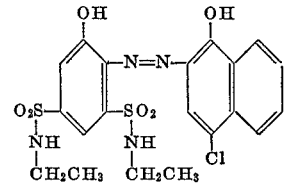

(III)

is a dyestuff which colors with a brilliant reddish blue shade (navy blue) and which has outstanding characteristics of purity. It also has a neutral bath affinity for natural and synthetic polyamidic fibers and good reserve effects (rayon, acetate and cotton). The resulting dye has good levelling properties and fastness to wet treatments and light.

This complex is postulated to have the following formula:

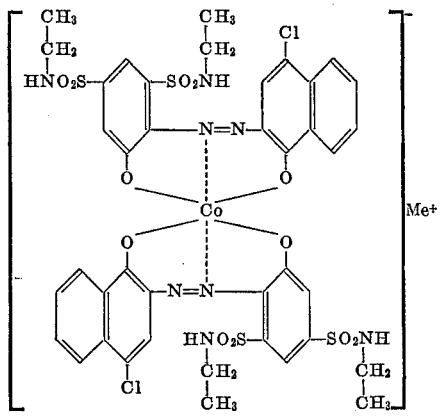

wherein Me is an alkaline metal (in this particular case, sodium).

This invention also provides a process for obtaining the above mentioned dyestuffs. In accordance with the process of the invention, the monoazo compounds (obtained by coupling a diazo of a disulfamyl base with 4-chloro-1-naphthol), previously dried, are treated under anhydrous conditions with a mixture of organic compounds, such as urea-dimethylformamide or urea-ethyleneglycol, in a ratio of from about 1 to 100 parts by weight of urea to 30 to 130 parts by weight of dimethylformamide or ethyleneglycol, and the desired metallizing agent (for instance a cobalt salt, such as its acetate or its sulfate, etc.) in approximately stoichiometric amounts. The amount of metal salt utilized in order to form the above indicated 1:2 complexes is generally ½ atomic proportion of metal per molecular proportion of a monoazo compound. The reaction temperature for the metallization is maintained between 100 and 140° C. The metallization time is very short, generally between 30 and 100 minutes.

At the end of the metallization, the molten mass is poured into water or is diluted with water, to which suitable amounts of caustic alkalies such as NaOH, etc. had been added, and then the metallized dyestuff is separated and dried by conventional methods.

The metallization, although preferably carried out under anhydrous conditions, may also be carried out in the aqueous phase, in the presence of a cobalt salt or a cobalt complex of an organic hydroxy acid, at temperatures of about 70–90° C., preferably at 80° C., for 2–3 hours. However, the results are not as satisfactory as when the metallization is undertaken under anhydrous conditions. It has been observed that when the metallization is undertaken in the aqueous phase, the finished dyestuffs have a lower solubility and are produced in a lower concentration.

It has further been found that the present invention affords particular yield advantages over the prior art discussed above. Thus, when 1-naphthol is used as the coupling component (rather than the 4-chloro-1-naphthal used in the present invention), about one third of the coupling takes place in the para (4) position to thus yield a compound which is incapable of forming a 1:2 metallized complex.

EXAMPLE 1

32.5 g. of 3,5-bis-N-ethylsulfonamido-2-amino-phenol were indirectly diazotized at 0–5° C. by pouring a solution of the sodium salt, to which had been added 6.9 g. of $NaNO_2$, into dilute hydrochloric acid. The above was then neutralized to Congo Red with a 20% solution of sodium carbonate. The neutralized solution was poured into an alkaline solution consisting of 18.7 g. of 4-chloro-1-naphthol (105% of the theoretical value) at a temperature of about 0–5° C. (volume about 1500 ml.: pH about 9.5). At the end of the coupling, the monoazo compound was separated by filtration and dried at 80° C.

The dried monoazo compound was heated to 100° C. with a mixture consisting of 100 g. of urea, 47.5 g. of dimethylformamide and 0.5 g. mol. of cobalt acetate. The mixture was heated to 120° C. and kept at this temperature for 1.5 hours in order to complete the metallization. The molten mass was poured into 1000 ml. of water, to which 50 ml. of 36° Bé. NaOH had been added. The dyestuff was precipitated from the solution obtained by salting out with 10% by weight of NaCl and by decreasing the pH with 45 g. of sodium bicarbonate to pH 10.5. It was then separated by filtration at 65° C.

After drying at 80° C., a dark-blue powder was obtained which dyed natural and synthetic polyamidic fibers in a reddish-blue shade (navy blue) having better characteristics and fastness to wet treatments and light than those obtained using a dyestuff prepared in a non-anhydrous phase.

EXAMPLE 2

0.1 g. mol. of the monoazo compound prepared as described in Example 1 were introduced in the form of a paste into a 3-necked flask containing 1000 ml. of water and 50 ml. of sodium hydroxide (36° Bé.). The mixture was agitated until a complete solution was obtained. The solution was acidified to sharp Congo Red by slowly adding 21° Bé. HCl dropwise. The solution was agitated for one hour, and then heated at 70° C. 0.05 g. mol. of cobalt chloride (in a 6% solution) were added and then NaOH was added dropwise until a slight color change of phenolphthalein appeared.

The solution was heated to 80–85° C. and kept at this temperature for about 2 hours in order to complete the metallization. The mass was discharged into 1000 ml. cold water, was salted out by adding 10% NaCl, filtered, and washed with a brine at 10% concentration. The cake which separated was dried at 80° C.

A dark-blue powder was obtained which dyed wool and polyamidic fibers in a neutral or slightly acid bath, with good general fastnesses, particularly light fastness.

EXAMPLE 3

In order to compare the properties of the dyestuffs of the present invention with related prior art dyestuffs, comparative tests were carried out on the following dyestuffs (using always the anhydrous mixture of 100 g. urea and 47.5 g. dimethylformamide +0.5 g. mol. of the metal salt specified in Example I):

I. The 1:2 cobalt complex of the monoazo having the structure:

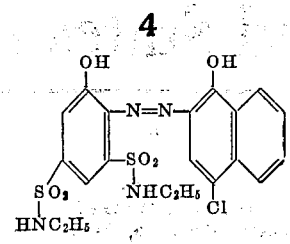

(dyestuff of Example 1).

IIa. The dyestuff obtained by metallizing (with a chromium (III)-acetate) the monoazo compound having the structure:

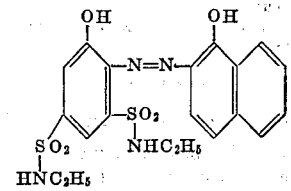

IIb. The dyestuff obtained by metallizing (with a cobalt (II)-acetate) the monoazo compound having the structure:

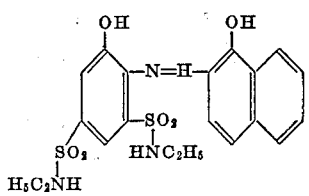

III. The dyesutff obtained by metallizing (with cobalt (II)-acetate) the monoazo compound having the structure;

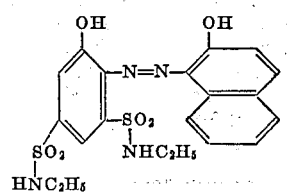

Direct dyeing comparisons of wool samples (concentration of the dyeing bath: 2%) were carried out between the dyestuffs derived from compounds I, IIa, IIb and III.

The dyestuff obtained by metallizing compounds IIa and IIb and IIB had more reddish shades than that of the dyestuff obtained from compound I, and showed poorer tinctorial characteristics (affinity and purity).

Compound III, while showing a similar structure to that of compound I, also yielded a metallized dyestuff having a more reddish shade. Additionally, its shade was too turbid to be employed with success industrially. Furthermore, the exhaustion of the dyeing bath was also poorer. ("Exhaustion of the dyeing bath" relates to the ratio between the concentrations of the dyestuffs in the dye bath before and after the dyeing process.) Dyestuff I also exhibited greater affinity to wool than dyesuff III.

The following fastness tests were carried out, the dyeing having been performed in a slightly acid bath (pH 5 to 5.5).

| Dyestuff | Light (Xen) | Washing 60° C. | Fulling (neutral) | Perspiration | Potting at— 90° C. | 100° C. |
|---|---|---|---|---|---|---|
| I | 5–6 | 3–4 | 4 | 4 | 4 | 3–4 |
|  |  | 4 | 4–5 | 4–5 | 3 | 2 |
|  |  | 4–5 | 4–5 | 4–5 | 4–5 | 4 |
|  |  | 3–4 | 4 | 4 | 3–4 | 1–2 |
| IIa | 5–6 | 4 | 4–5 | 4–5 | 2 | 1 |
|  |  | 4–5 | 4–5 | 4–5 | 4–5 | 4 |
|  |  | 3 | 4 | 4 | 3–4 | 1–2 |
| III | 5–6 | 4 | 4–5 | 4–5 | 2 | 1 |
|  |  | 4–5 | 4–5 | 4–5 | 4 |

The values given for light fastness correspond as follows to a fastness of a dyed sample which can be exposed to sunlight without alteration for the respective varying number of hours.

| Value: | Number of hours |
|---|---|
| 1 | 3 hours 25 minutes. |
| 2 | 6 hours 50 minutes. |
| 3 | 17 hours 50 minutes. |
| 4 | 41 hours 50 minutes. |
| 5 | 75 hours 20 minutes. |
| 6 | 143 hours 20 minutes. |

The fastness tests of "Washing," "Potting," "Perspiration" and "Fulling" (neutral) were carried out according to the Unitex Standards (Unitex 2, IIIrd ed. 1959, Milan, Italy).

The standards relating to the fastness tests of the shades there contained were compiled in part according to the ECE methods (ECE Richtinien) published in German and French and obtainable from ECE, Unterstrasse 11, Saint Gall, Switzerland, and in part according to the method disclosed in ISO/TC 38–Textile Recommendation R 105 (International Standardisation Organisation) published in English, French and Russian and obtainable through the national standards organizations or from ISO, 1, Rue de Varende, Geneva, Switzerland (C.I. Supplement 1963, XVII).

The values of the fastnesses to wet treatments are given in a 1–5 scale.

The three values expressing the results of the fastness tests to washing at 60° C. and to potting as 90° C. and 100° C. respectively, have the following significance:

(a) The first figure indicates the variation of shade and intensity of the dyeing on the wool material under the action of the degrading agents. The numerical values 1 to 5 may be specified, according to C.I. (vol. 4, 1956, page 4011), as follows:

Alteration:
5=shade unaltered
4=very slight loss in depth or alteration
3=appreciable loss or alteration
2=distinct loss or alteration
1=great loss or shade much altered.

(b) The second figure indicates, with inverse proportionality, the quantity of the dyestuff bled on the white wool sample. The numerical values 1–5 may be specified, according to C.I. (vol. 4, 1956, page 4011), as follows:

Staining:
5=no staining of adjacent white
4=very slight staining of adjacent white
3=appreciable staining of adjacent white
2=deep staining of adjacent white
1=adjacent white dyed deeply.

(c) The third figure indicates, with inverse proportionality, the quantity of dyestuff bled on the white cotton sample. The numerical values 1–5 may be specified, according to C.I. (vol. 4, 1956, page 4011), as follows:

Staining:
5=no staining of adjacent white
4=very slight staining of adjacent white
3=appreciable staining of adjacent white
2=deep staining of adjacent white
1=adjacent white dyed deeply.

As can be clearly seen, dyestuff I showed extremely good values to potting at 90° C. and particularly at 100° C., the latter values being much superior to those shown by dyestuffs IIa and III. This is a very important attribute, particularly during the treatments which the fibers undergo when woven, such as potting, a very important process which is applied to give a bright finish, a soft "feel" and a permanent dimensional stability to the woolen cloths.

Variations can, of course, be made without departing from the spirit of the invention.

Having thus described our invention, what we desire to secure by Letters Patent and hereby claim is:

1. A metal complex dyestuff of the general formula:

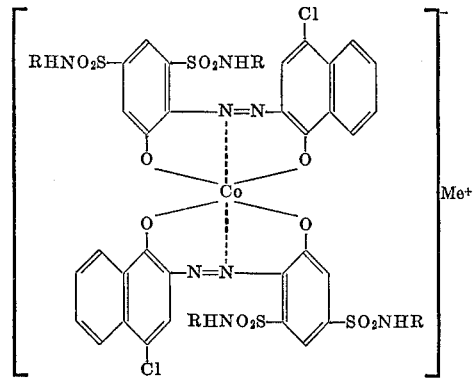

wherein R is an alkyl radical having 1 to 4 carbon atoms, and Me is an alkali metal.

2. The dyestuff of claim 1 wherein R is $-CH_2CH_3$ and Me is sodium.

References Cited

UNITED STATES PATENTS

| 2,767,166 | 10/1956 | Strobel et al. | 260—147 |
| 3,040,019 | 6/1962 | Neier | 260—151 |
| 3,071,571 | 1/1963 | Gross et al. | 260—151 |
| 3,078,267 | 2/1963 | Armento et al. | 260—151 |

CHARLES B. PARKER, Primary Examiner

D. M. PAPUGA, Assistant Examiner

U.S. Cl. X.R.

8—42, 54; 260—198